Dec. 22, 1959     I. SENZANI     2,917,959
APPARATUS AND METHOD FOR CUTTING DRIED ALIMENTARY PASTE
Filed Aug. 19, 1953     8 Sheets-Sheet 2

INVENTOR.
IRO SENZANI
BY
*Pearson + Pearson*
ATTORNEYS

Dec. 22, 1959        I. SENZANI        2,917,959
APPARATUS AND METHOD FOR CUTTING DRIED ALIMENTARY PASTE
Filed Aug. 19, 1953        8 Sheets-Sheet 3
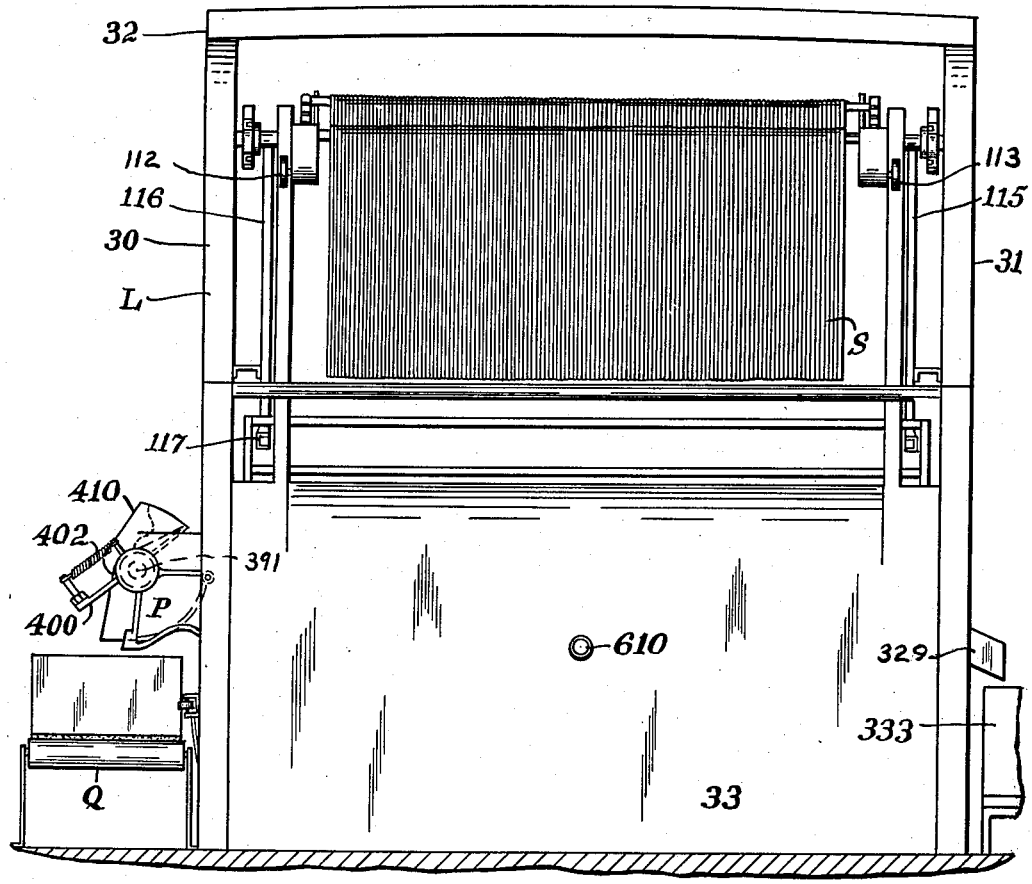
Fig. 3.
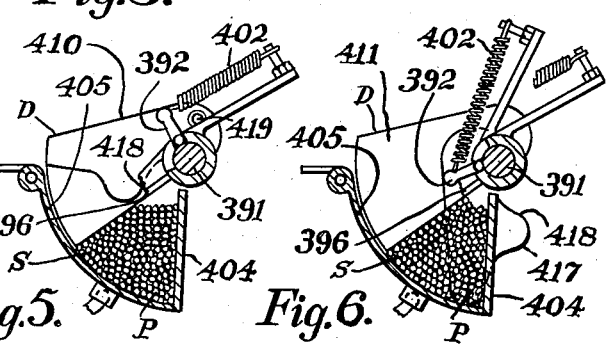
Fig. 5.     Fig. 6.
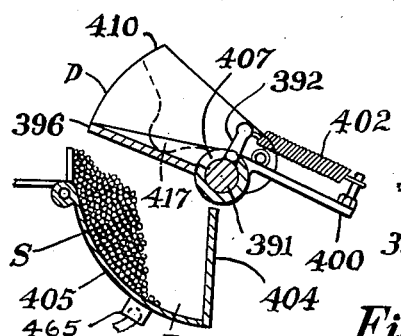
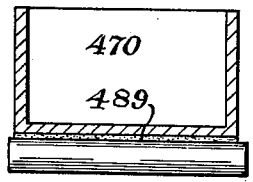
Fig. 4.
INVENTOR.
IRO SENZANI
BY
Pearson + Pearson
ATTORNEYS

INVENTOR.
IRO SENZANI

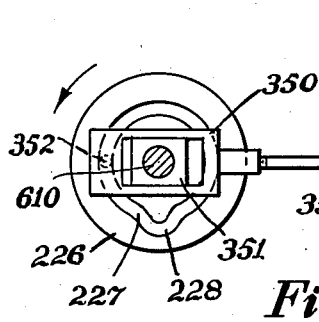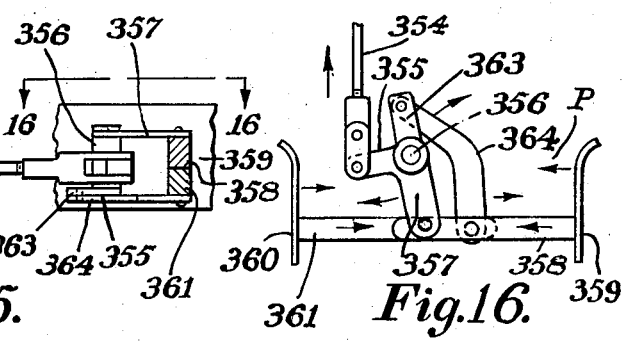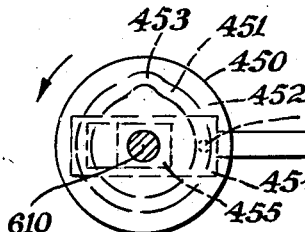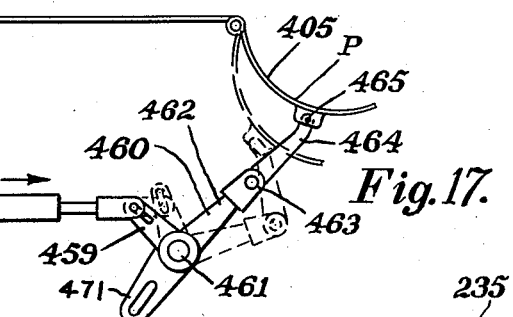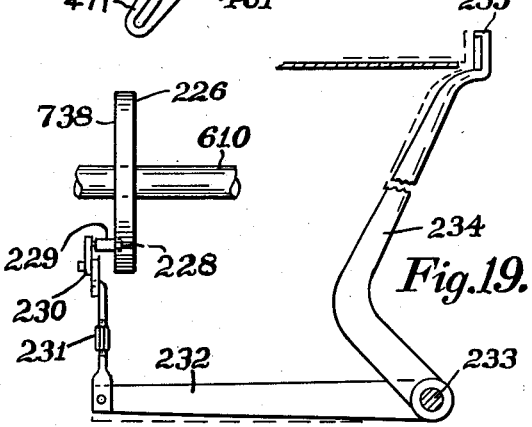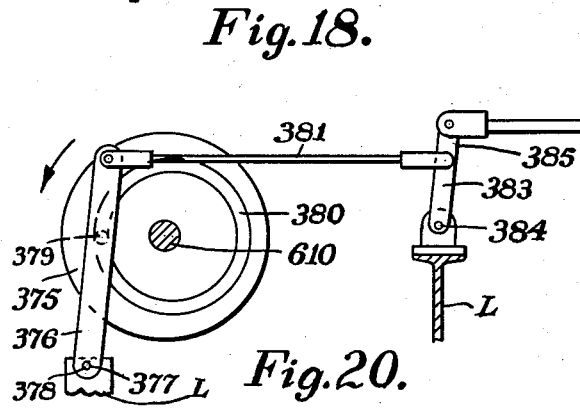

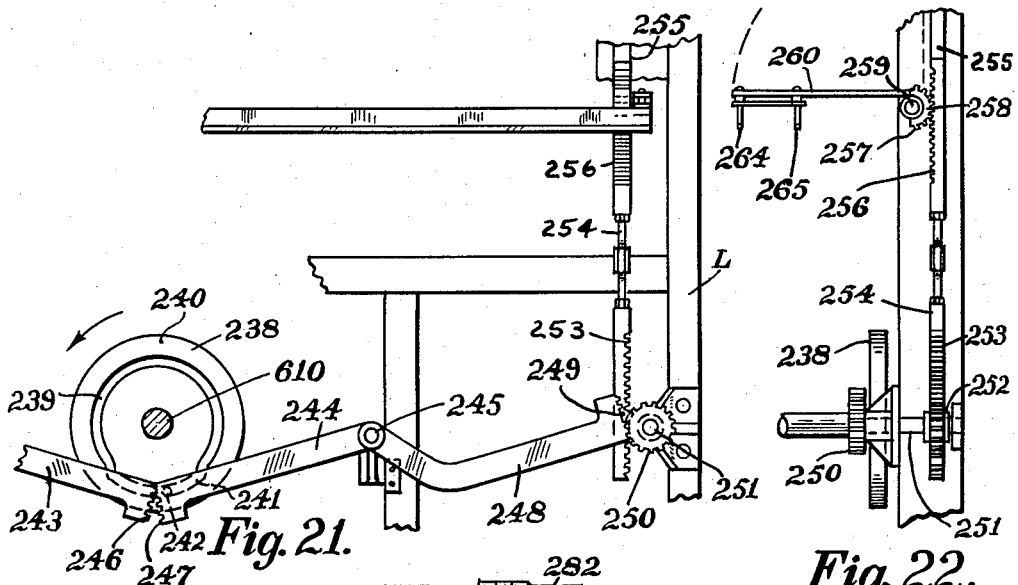
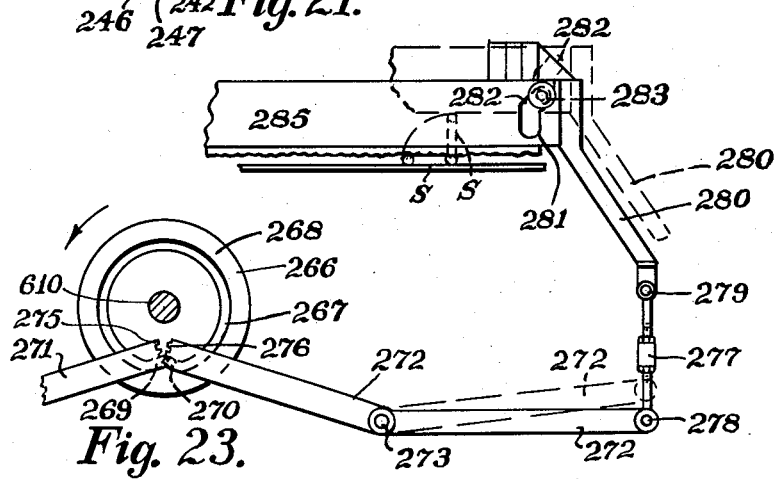
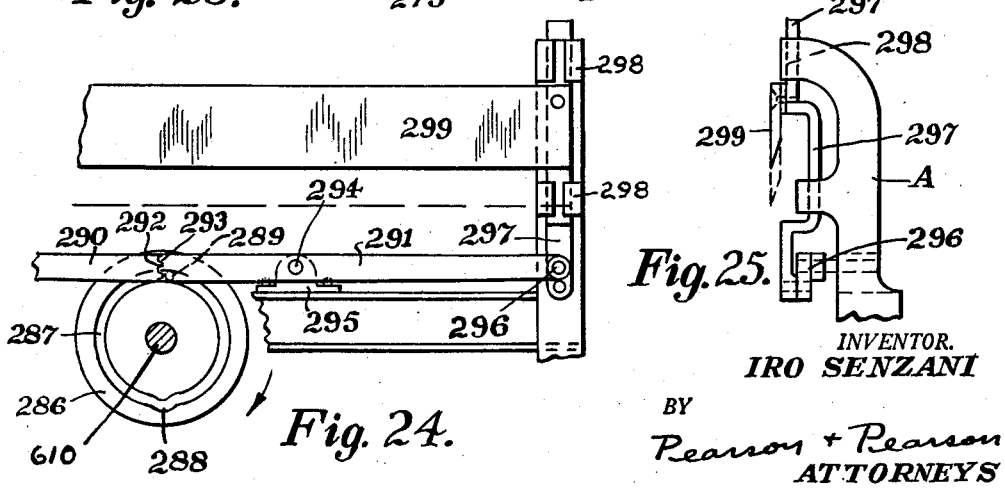

Dec. 22, 1959           I. SENZANI           2,917,959

APPARATUS AND METHOD FOR CUTTING DRIED ALIMENTARY PASTE

Filed Aug. 19, 1953           8 Sheets-Sheet 8

INVENTOR.
IRO SENZANI
BY
Pearson + Pearson
ATTORNEYS

United States Patent Office 2,917,959
Patented Dec. 22, 1959

2,917,959

APPARATUS AND METHOD FOR CUTTING DRIED ALIMENTARY PASTE

Iro Senzani, Faenza, Italy

Application August 19, 1953, Serial No. 375,090

19 Claims. (Cl. 83—17)

This invention relates to machines for automatically cutting strips of looped dried alimentary paste, such as spaghetti, into shorter package lengths.

This application shows a machine similar to that of my co-pending application, Serial No. 234,540, filed June 30, 1951 entitled, "Handling Machines For Spaghetti and Like Products" now U.S. Patent 2,813,498 of November 19, 1957. In my said Patent 2,813,498 of November 19, 1957, a machine and method was described for individually and successively removing rod, over which dried rows of alimentary paste strips were looped, from a drying rack, laying the same on a substantially horizontal sweeping table and withdrawing the rod. The row of dried alimentary paste strips was then swept across the sweeping table into a cutting trough and the unlooped ends of the paste strips were then aligned in the trough. Thereafter, the strips were gathered into a compact bundle in the cutting trough, a pair of knives operated to cut off the looped ends and cut the strips into package lengths and the cut portions were then discharged from the trough.

In this application, I continue to use transfer arms similar to those described and claimed in said Patent 2,813,498 of November 19, 1957, and continue to use a sweeping table, with a cutting trough at one end, as in said patent. However, instead of sweeping the looped strips into a trough and cutting off the loops in that trough, I have discovered that great improvement is secured by cutting off the loops on the sweeping table before the strips are swept into the cutting trough. In so doing it becomes possible to align the looped ends of the strips, while they are spread out across the sweeping table, to flatten the strips on the table and to cut off identical lengths of the looped portions on the table, thereby leaving straight strips of maximum length to be swept into the cutting trough. The straight strips are then centered under a cutting knife to be cut into desired lengths therein and then discharged into suitable containers. While the aligning and cutting operations on the sweeping table may require slightly longer time than when occurring in the cutting trough, the time loss has been overcome by mounting the rod transfer arms to travel a little more rapidly when moving between stations.

The principal object of this invention is to provide a machine and method for cutting looped dried alimentary paste strips into package length products in which the looped portions are removed while the strips are spread out, aligned and flattened against the surface of a table instead of when the strips are gathered into a compact bundle.

Another object of the invention is to provide speed changing means for the rod transfer means capable of compensating for any loss of operation time occurring in cutting off such looped ends while on the surface of a table rather than in a trough.

A further object of the invention is to provide strip sweeping mechanism for sweeping strips across a table, which mechanism does not interfere with the strip aligning and loop cutting mechanism and which avoids the possibility of a strip becoming broken or pulverized thereunder.

Still another object of the invention is to provide a device for cutting package lengths from strips of looped, dried alimentary paste wherein the cut off looped portions are substantially identical in length to form a valuable commercial product and the remaining straight sections include as much of the strip as possible for cutting into shorter package sections of uniform length, without waste.

A still further object of the invention is to provide a device for automatically cutting off identically sized loops from looped dried alimentary paste strips by aligning said looped strips at their looped ends before cutting through the strips to sever the looped portions thereof.

In the drawings, Fig. 1 is a sectional side elevation taken on line 1—1 of Fig. 2 of a machine embodying the invention with part of the side frame broken away.

Fig. 3 is a front view taken from the right of the machine shown in Fig. 1.

Fig. 4 is a fragmentary rear view in section on line 4—4 of Fig. 1, and slightly enlarged, of the cutting trough and a gathering arm of the invention.

Fig. 5 is a view similar to Fig. 4 showing the dried paste product being gathered into a compact bundle in the cutting trough.

Fig. 6 is a view similar to Fig. 5 showing the bundle being cut into package lengths.

Figure 2:
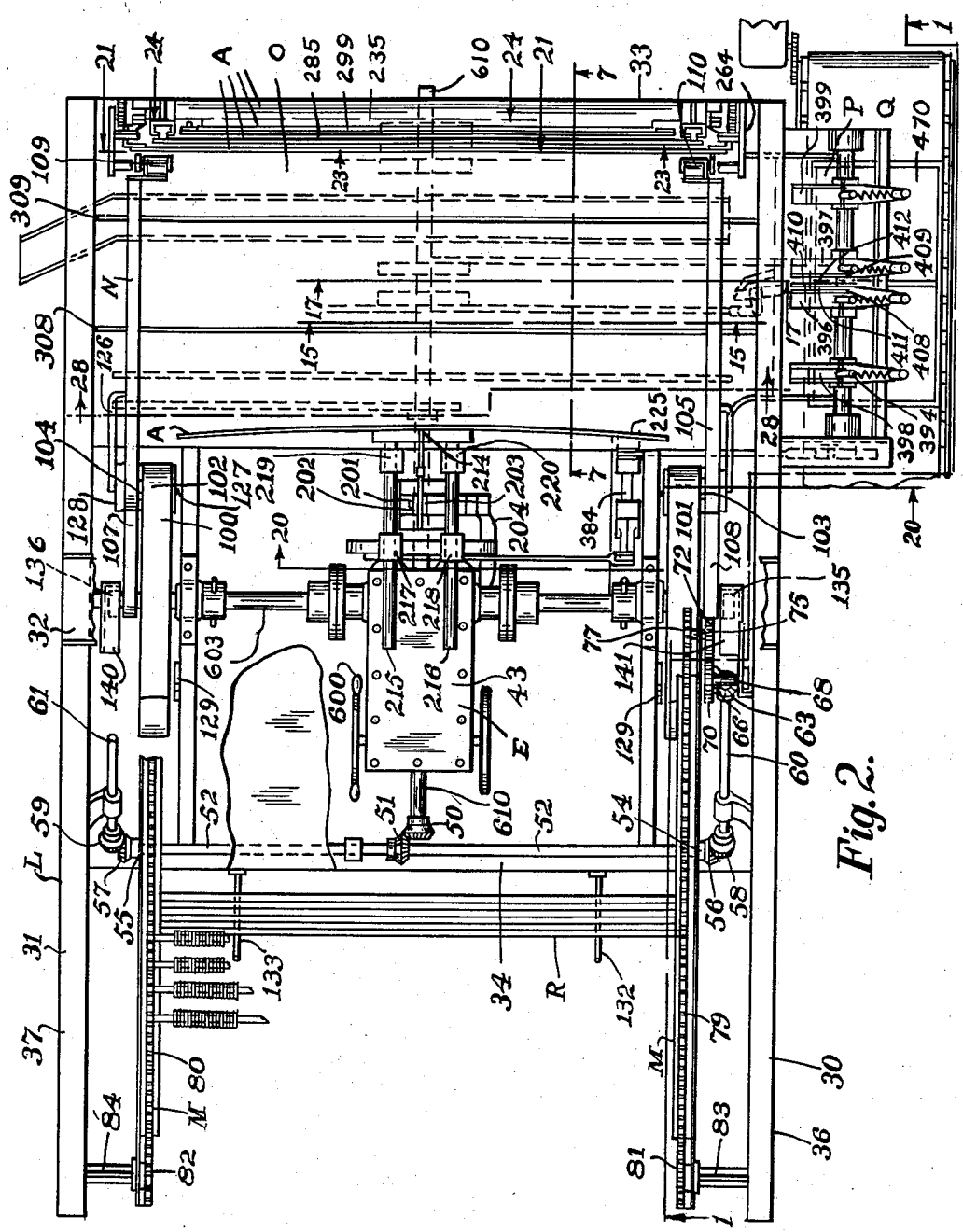
Fig. 2 is a plan view of the machine shown in Fig. 1.

Figs. 7-12 inclusive are diagrammatic side elevations, on line 7—7 of Fig. 2, showing the cycle of operations of the machine in cutting off the looped ends of the dried paste product before the operation of sweeping the straight strips across the table into the cutting trough.

Figures 13, 14:
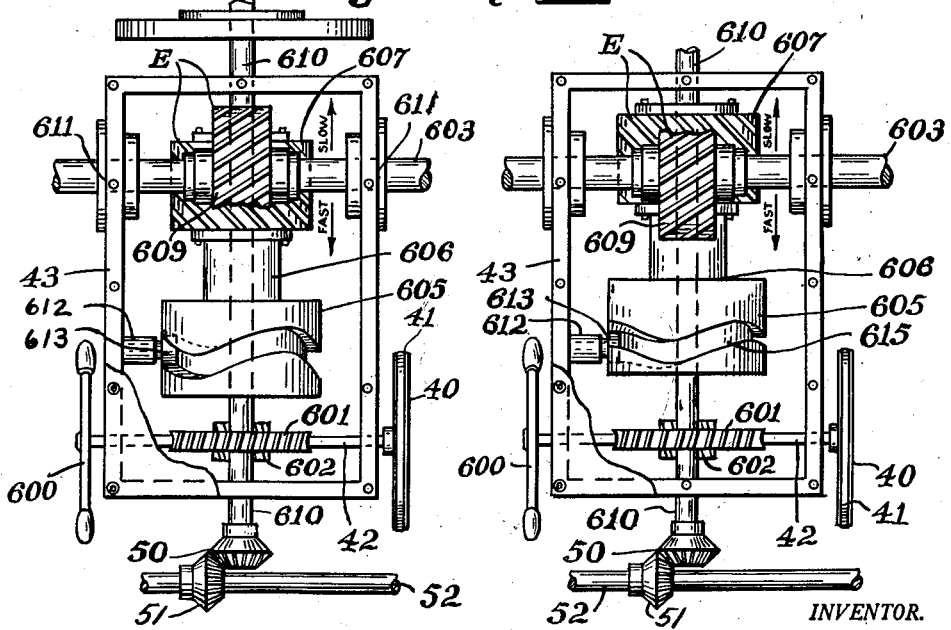

Fig. 13 is a plan view of the speed changing means for driving the rod transfer means of the machine.

Fig. 14 is a view similar to Fig. 13 showing the lower helical gear in a different position.

Fig. 15 is a rear elevation on line 15—15 of Fig. 2 showing the operating mechanism for causing the opposite ends of the cutting trough to approach, and retract from, each other.

Fig. 16 is a side view of the mechanism shown in Fig. 15.

Fig. 17 is a rear elevation on line 17—17 of Fig. 2 showing the operating mechanism for lowering the trough bottom wall and discharging the cut product from the cutting trough.

Fig. 18 is a rear elevation similar to Fig. 17 showing the operating mechanism for the second strip aligning plate which aligns the looped ends of the paste product.

Fig. 19 is a side elevation of the mechanism shown in Fig. 18.

Fig. 20 is a rear elevation similar to Fig. 17 of the operating mechanism for oscillating the gathering arms and strip cutting knife in the cutting trough.

Fig. 21 is a rear elevation on line 21—21 of Fig. 2 of the operating mechanism for oscillating the strip hold down bars of the invention.

Fig. 22 is a side elevation of the mechanism shown in Fig. 21.

Fig. 23 is a side elevation on line 23—23 of Fig. 2 of the operating mechanism for the strip flattening bar of the invention.

Fig. 24 is a rear elevation on line 24—24 of Fig. 2 of the operating mechanism for the loop cutting knife of the invention.

Fig. 25 is a side elevation of the mechanism shown in Fig. 24.

Figure 26:
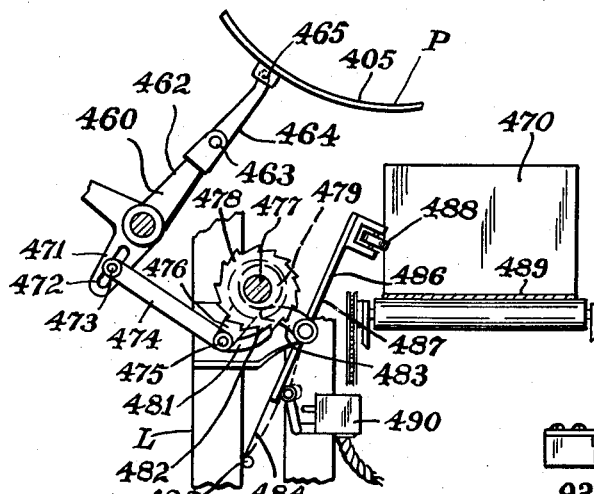

Fig. 26 is a rear elevation of the mechanism for automatically counting the boxes filled and conveying the boxes of package length strips away from the machine.

Figure 27:
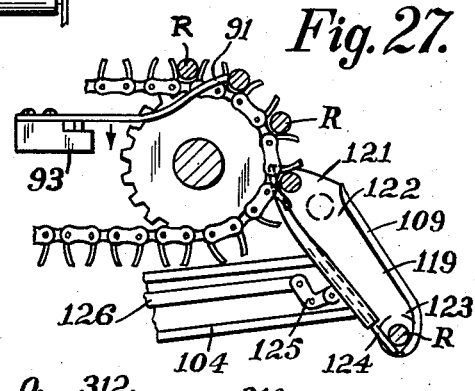

Fig. 27 is an enlarged side elevation of the micro switch stop motion of the rod feeding means and the rod engaging and disengaging head of the rod transfer arms of the invention.

Figure 28:
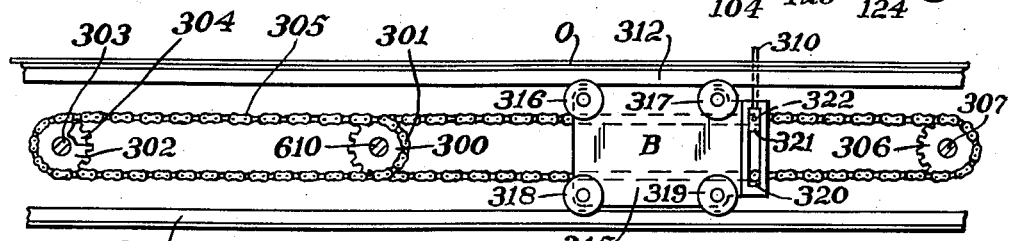
Figure 29:
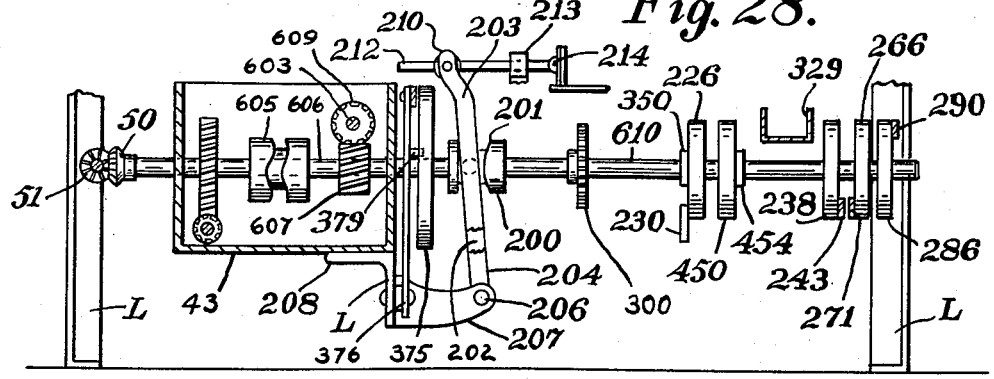

Fig. 28 is a rear elevation on line 28—28 of Fig. 2 showing the strip sweeping and loop sweeping means of the invention, and Fig. 29 is a detail side view of the main drive shaft of the device, to indicate the positions of the various operating gears, cams and levers thereon.

Figure 1:
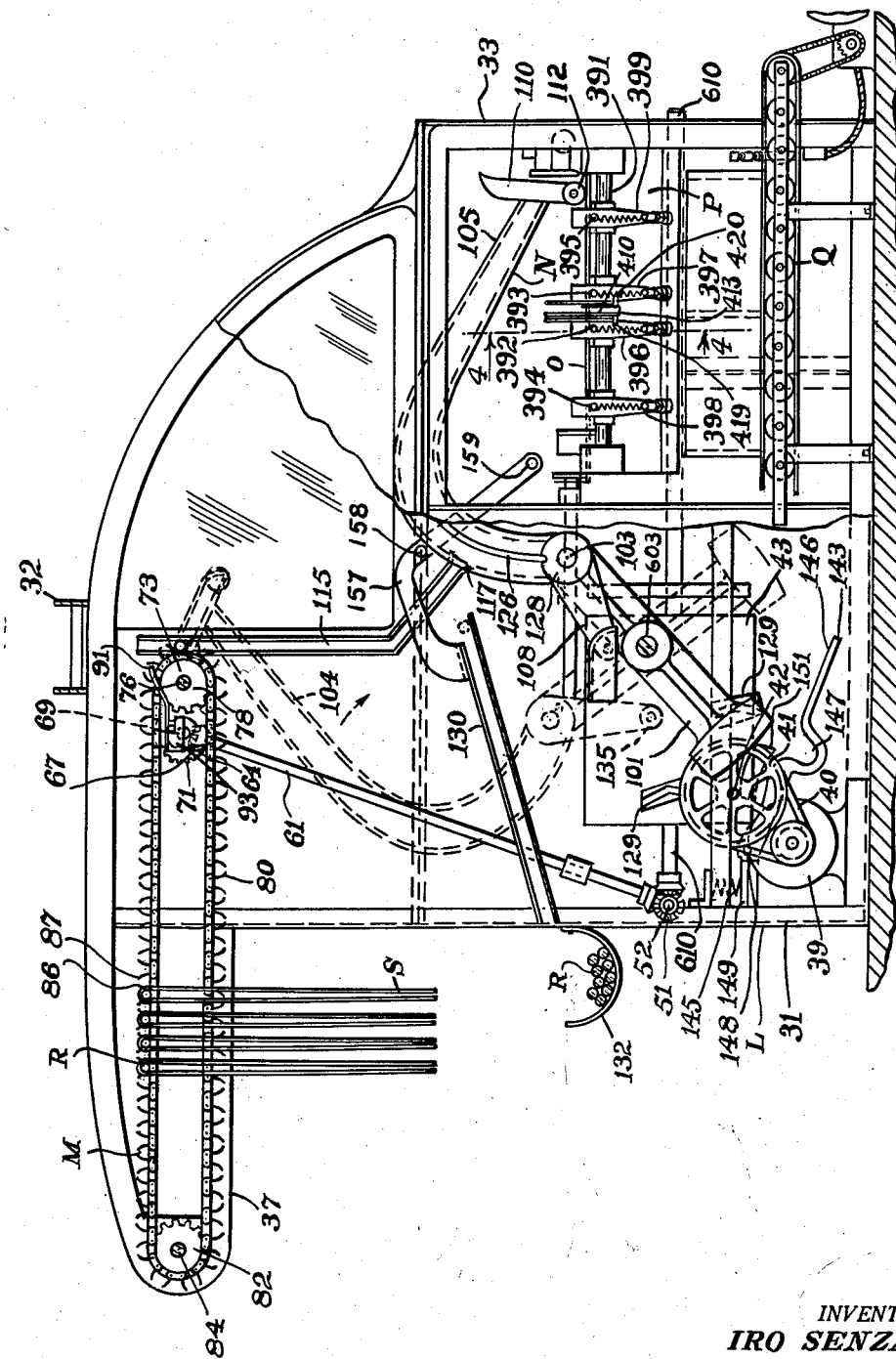

As best shown in Figures 1-3 inclusive, the machine of this invention includes a frame L having a pair of opposite side pieces 30 and 31, a top frame piece 32, a front 33 and a rear 34. A pair of integral, rearwardly extending frame sections 36 and 37 are provided at the upper portion of side pieces 30 and 31 to support the rod feeding means M of the machine. An electric motor 39 is provided, connected by a belt or chain 40, to a pulley or sprocket 41, mounted on a shaft 42 suitably journalled in a gear box 43.

Speed changing means

Gear box 43 contains the speed changing means E for the rod transfer means N of the invention and this means is best shown in Figs. 13, 14 and 29. As indicated therein, a hand wheel 600 is mounted on the opposite end of shaft 42 for manual operation and a worm gear 601 is fixed intermediate of shaft 42. A gear 602 is meshed at right angles with, and is revolved by gear 601, gear 602 being fixed to the main drive shaft 610 of the machine. The speed changing means E for the rod transfer means N of the invention includes a cam 605, a sleeve 606 and a helical gear 607, all forming one piece and keyed to slide axially on shaft 610 but to revolve therewith. Means E also includes a helical gear 609 meshed at right angles to and revolved by, helical gear 607, the helical gear 609 being mounted on a shaft 603, journalled at bearings 611, 611 in gear box 43. The shaft 603 carries at each opposite end the rotative power applying base members 100 and 101 of the rod transfer means N of the invention, each base member having pivoted thereto a rod transfer arm 104 or 105 by means of the pivot pins 102 or 103.

Means E also includes a stud 612 projecting inwardly from a wall of gear box 43 and carrying a roller 613 in rolling contact with the side walls of the slot or groove 615 in cam 605. While the main drive shaft 610 is continually rotated at a uniform speed by the power train from motor 39, the speed of the shaft 603 and the rod transfer means N is varied by the axial sliding of helical gear 607 while still enmeshed with helical gear 609. The teeth of both gears are at about a 45° angle and, as indicated in Fig. 13, when cam 605 slides gear 607 rearwardly it continues to revolve gear 609 but with accelerated speed. When cam 605 slides gear 607 forwardly it also continues to revolve gear 609 but with decelerated speed. The slot 615 of cam 605 is so shaped as to slide helical gear 607 forwardly and rearwardly three times during each revolution of the shaft 610, thus causing rod transfer means N to slow down upon approaching, and while at, three separate stations and to speed up while traveling between the three stations.

By reason of this speed changing means E, the rod transfer arms 104 and 105 are caused to pick up a loaded rod R from the rod feeding means M at slow speed. After engaging a loaded rod R, the arms 104 and 105 accelerate quickly through an arcuate path down to about two inches above the sweeping table O and then decelerate to lay the rod R with its load carefully on the table O. The transfer arms 104 and 105 then accelerate quickly to rapidly withdraw the rod R from between the looped strips of dried alimentary paste S deposited on the table and then again decelerate to release or disengage the rod R. At the rod release station, the angle of the slot or groove 615 in cam 605 is preferably at the same angle of 45° as the teeth of helical gear 607 so that for an imperceptible instant the rod transfer arms 104 and 105 cease to move in their path. After leaving the rod release station, the arms 104 and 105 again accelerate until they approach the rod feeding station where they slow down to receive and engage another rod R. Unlike a Geneva motion, or other intermittent motions, the speed changing means E simply accelerates and decelerates without definite stops except, as explained above, at the rod release station and extremely smooth operation is thereby obtained.

Rod transfer means

Having referred to the changing speed of the rod transfer arms 104 and 105, the path and construction of the rod transfer means N will now be described. Each rod transfer arm 104 and 105 is pivoted at 102 or 103 to a rotative power applying base member 100 or 101 and the members 100 and 101 are rotated by shaft 603 through speed changing means E. Each rod transfer arm such as 104 or 105 is provided with an integral, angularly-disposed extension 107 and 108 on the opposite side of its pivot by which its path may be controlled. Oppositely disposed rod engaging heads 109 or 110 are provided near one terminal end of each transfer arm 104 or 105, each having a roller 112 or 113 which, during a portion of the circuit of the arms, enters one of a pair of oppositely disposed guide tracks 115 or 116 attached to the frame L. The mouth, or entrance of one of such guide tracks is shown at 117 in Fig. 1 and in dotted lines, a transfer arm 104 is shown as having moved up the guide track into engagement with the loaded rod feeding means M.

As best shown in Fig. 27 each rod engaging head such as 109 or 110 includes a way such as 119 whose outer wall 121 is spaced from the inner wall to permit a rod R to drop into the opening 122 therebetween and slide to the closed bottom 123 of the head.

Figure 7:
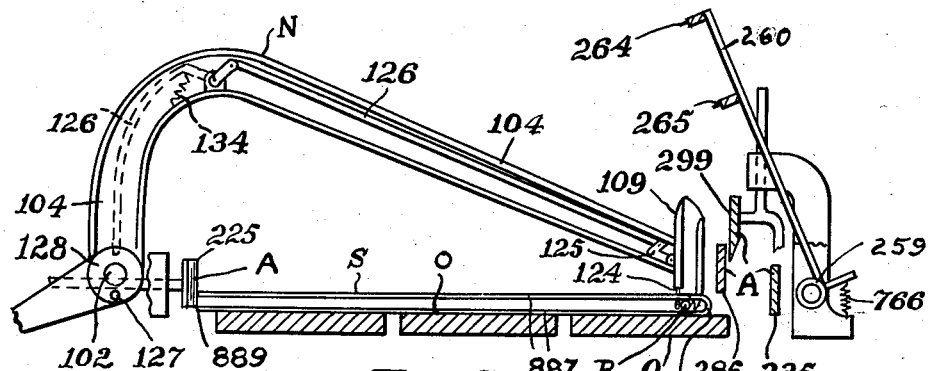

Each of the heads 109 and 110 is provided with a gate 124 normally coacting with the closed end 123 to support rod R (Fig. 27). As best shown in Fig. 7, the gate 124 of head 109 is slidably mounted thereon and pivotally connected to a bell crank lever 125, the latter being fulcrumed on arm 104 and actuated by linkage designated generally 126. Linkage 126 extends down arm 104, first on the inside and then on the outside thereof, to a pivotal connection with the outside member of rotatable element 128. A pin 127 extends inwardly from the inside member of element 128 and is positioned to be received in one of a pair of fixed cams such as 129 when the heads 109 and 110 are at rod releasing position just above a track 130. The track 130 guides the empty rods R into a pair of curved collecting arms 132, 133. Arm 105 includes similar mechanism for connecting its sliding gate 125 to its pin 127, the latter coacting with the opposite cam 129 whereby both gates are actuated simultaneously. The cams 129 are mounted by any suitable means such as welding on oppositely disposed longitudinally extending frame pieces of the frame L and include angular cam tracks which face outwardly. The cam tracks turn the pins 127 and the elements 128, relative to the arms 104 and 105 on their respective pivot pins 102 and 103 thus pulling on the linkages 126 and causing the gates 124 to slide open and release a rod. Suitable return springs 134 are provided to move the gates 124 into closed position.

After a rod R has dropped into the oppositely disposed heads 109 and 110, of transfer arms 104 and 105, the power applying base members 100 and 101 rotate at increased speed in a clockwise direction carrying the heads in an arcuate path downwardly until they are several inches above sweeping table O, at which point the arms slow down to deposit the rod R on the table. Rollers 112 and 113 are provided on heads 109 and 110 so that they may be withdrawn along table O without friction. Rollers 135 and 136 are also provided at the terminal ends of the integral extensions 107 and 108 of transfer arms 104 and 105 and are arranged to enter oppositely disposed cam tracks called herein pivot lock recesses 140 and 141 fixed to the frame L in the path of rollers 135 and 136. As shown in full lines in Fig. 2, as the power applying base members 100 and 101 rotate, the transfer arms 104 and 105 are thus caused to tip forwardly to deposit a rod R on table O.

Continued rotation of base members 100 and 101 in their circular path causes the heads 109 and 110 to withdraw transversely across table O, again at accelerated speed due to speed changing means E, and causes the rod R to be withdrawn out of the unlooped ends of the dried alimentary paste strips S. After revolving through an arc of about 180° the base members 100 and 101 carry the rollers 135 and 136 into contact with a pair of oppositely disposed cams such as 143 fixed to frame L in the path of said rollers. Each cam such as 143 includes an inclined straight cam track 146 provided with a roller recess 147 and pivoted at 148. An extension 149 is provided on the other side of the pivot 148 and a spring 145 permits the cam track 146 to yield upon engagement with a roller such as 135. A pair of oppositely disposed fixed buffers such as 151 are provided just above recess 147 to cooperate with the track 146 in positively guiding the rollers such as 135 and 136.

Thus the rollers 135 and 136 engage the yielding inclined tracks such as 146 of cams such as 143 which tend to brake the extensions 107 and 108 and then to guide the rollers into recesses such as 147 of the cams where the rollers engage the fixed buffers such as 151. The effect of the buffers such as 151 is to raise the heads 109 and 110 of transfer arms 104 and 105 whereby the rollers 112 and 113 enter the mouths such as 117 of the fixed roller guide tracks 115 and 116. As stated above, directly over the rod tracks 130, the rod transfer arms 104 and 105 preferably stop momentarily while pins such as 127 engage cams such as 129 thereby opening gates 124 and releasing the rod R onto tracks 130. Thereupon the arms 104 and 105 travel at accelerated speed up the guide tracks 115 and 116 and then slow down to receive a loaded rod R from the rod feeding means M.

To assist in depositing the strips of dried alimentary paste S, which depend downwardly from each rod R, flatwise on table O, a pair of brackets such as 157 are fixed to frame L and carry a plurality of bars 158 and 159. The bars 158 and 159 extend parallel to the longitudinal axis of table O in the path of the lower portions of strips S as they are moved in an arcuate path from the rod feeding means M to the table O by rod transfer arms 104 and 105. Thus the bars 158 and 159 exert successive retarding forces on the lower portions of strips S to gradually move the strips from a vertical depending position to a horizontal table supported position.

Rod feeding means

Referring again to gear box 43 and main drive shaft 610, it will be noted that the shaft 610 extends rearwardly of gear box 43 and carries a bevel gear 50 at its terminal end. Gear 50 is enmeshed with a similar bevel gear 51, at right angles, the gear 51 being intermediate of a shaft 52 extending across the frame L and journalled therein at 54 and 55. A pair of bevel gears 56 and 57 are mounted at opposite terminal ends of shaft 52 and each is meshed with one of a pair of similar bevel gears 58 and 59 carried at the ends of a pair of inclined shafts 60 and 61, each extending upwardly to the rod feeding means M. Bevel gears 63 and 64 at the top of shafts 60 and 61 drive bevel gears 66 and 67, each mounted on a stub shaft such as 68 and 69 on opposite sides of frame L. The shafts 68 and 69 each carry a gear such as 70 and 71 which, in turn, drive gears 72 and 73, mounted on stub shafts 75 and 76, and a pair of oppositely disposed sprockets such as 77 and 78 are carried on stub shafts 75 and 76. A pair of endless chains 79 and 80 are trained around a pair of sprockets 81 and 82, carried by stub shafts 83, 84 at the rearward end of the integral, rearwardly extending frame sections 36 and 37 and are trained around the drive sprockets 77 and 78 to rotate in a clockwise direction.

Each chain such as 80 carries a plurality of spaced pairs of flexible, upstanding and outwardly curved rod engaging fingers 86 and 87 as shown in Fig. 1 and the rods R, with their rows of looped dried alimentary paste strips S are positioned between the chains 79 and 80 with each end of each rod resting between an opposite pair of fingers such as 86 and 87. The rods R with their loads S are transferred to feeding means M in the same manner as in the above mentioned prior application and are advanced slowly along the chains 79 and 80 in order not to cause the strips S to oscillate excessively. As the opposite ends of each rod R approach the upper portion of guide tracks 115 and 116, each end contacts one of a pair of flexible elements such as 91 (see Fig. 27) and bends the same downwardly to cause it to throw a pressure sensitive switch such as 93. The switches such as 93 are included in an electric circuit of a well known type to the motor 39, and are arranged to permit continued operation of the machine so long as both switches are depressed simultaneously indicating that rod R is properly positioned at each end to drop into the pair of heads 108 and 109 of transfer arms 104 and 105. If a rod is misaligned only one switch will be actuated, thereby failing to complete a circuit and stopping the machine.

Loop cut off means

In my above mentioned prior application, the looped strips of dried alimentary paste S were deposited on a sweeping table such as O by rod transfer means somewhat similar to arms 104 and 105 with the strips extending axially of the machine but transversely of the elongated axis of the table. The strips, still looped, were then swept longitudinally of the table into a cutting trough, such as P, positioned at one end of the table where the strips were bundled and cut to separate the looped portions and divide the remainder of the strips into package lengths. In this invention, the loops are cut off while the strips are spread out on the table O by loop cut off means A (Figs. 7–12) which includes what are called herein a first strip aligning plate 225 for aligning the unlooped ends of the strips S, a second strip aligning plate 235 for aligning the looped ends of the strips S, a strip flattening bar 285 for flattening the strips on the table, a loop cut off knife 299 for removing the looped end portions of the strips after alignment and while flattened and strip hold down bars such as 264 and 265 for holding the strips down on the table O during all of the above operations.

First strip aligning plate

Referring to Figs. 13, 14 and 29, it will be noted that the main drive shaft 610 carries the cams and sprocket which control and drive the mechanism of the loop cut off means A. A cam 200 is mounted on shaft 610 and provided with a circumferential slot or groove 201 in which both forks 202 and 203 of a bifurcated yoke follower 204 are engaged. Follower 204, at its lower end, is pivoted at 206 to a bracket 207 extending forwardly from a frame piece 208 of frame L. At is upper end 210, follower 204 is pivoted to a rod 212, horizontally slidable in guide 213 and pivoted to the rear wall 214 of the first (or rear) strip aligning plate 225. Thus as the cam 200 revolves with shaft 610 it imparts through follower 204, a reciprocating motion to the first strip aligning plate 225. A pair of rods 215 and 216 (Fig. 2) extend rearwardly from first strip aligning plate 225 and are slidable in fixed guides such as 217, 218 and 219, 220 to keep the first strip aligning plate in proper alignment. The first strip aligning plate 225 extends transversely of the frame L and substantially parallel to the longitudinal axis of sweeping table O for the full length of the table to push the unlooped ends of the strips S into a straight line. Preferably plate 225 is bowed longitudinally to compensate for the fact that the rods R are usually bowed downwardly.

Second Strip aligning plate

Shaft 610 also carries a cam 226 which performs the double function of operating the opposite ends of the cutting trough, as shown in Figs. 15 and 16 and to be described below, and operating the second strip aligning plate 235 as shown in Figs. 18 and 19. As shown in Figs. 18 and 19 the cam 226 includes a cam groove 227 in one of its diametrical faces 738 the groove 227 being circular except at a raised portion 228 thereof. A pin 229 is engaged in groove 227 and is attached to a follower element 230 whereby the follower remains stationary during most of the revolution of the cam but is lowered and then lifted when the raised portion 228 engages the pin 229.

Follower 230 is connected by an adjustable link 231 to the terminal end of a lever 232 fixed to a shaft 233 whereby the lowering of the element 230 causes the lever 232 to assume the position shown in dotted lines in Fig. 19. A pair of supporting arms such as 234 are fixed at each end of shaft 233 and at their upper ends, the second strip aligning plate 235 is attached, plate 235 being thus movable to the position shown in dotted lines. The second strip aligning plate 235 is coextensive with the first strip aligning plate 225, and extends parallel to the longitudinal axis of table O in position to align the looped ends of the strips S when deposited on table O.

Strip hold down bars

A cam 238 is also carried by main drive shaft 610 and is provided with a groove 239 in one of its diametrical faces 240 as shown in Figs. 21 and 22. An elongated raised portion 241 is provided in groove 239 and a pin 242 is engaged in the groove 239 to act as a cam follower element. The operating mechanism on each side of cam 238 is identical, but reversed, and includes a pair of levers 243 and 244 each pivoted as at 245 and each having teeth such as 246 and 247 enmeshed with each other. Cam follower pin 242 is fixed to one of the pair of levers such as lever 244 whereby the levers remain stationary while engaged in the major portion of groove 239 but are lowered for a short time and then lifted while the pin 242 is engaged by the elongated raised portion 241. An integral extension such as 248 is provided on each lever 243 and 244, the extension 248 having teeth 249 engaged in a gear 250 mounted on a shaft 251 atached to frame L. Shaft 251 carries a gear 252 enmeshed with the teeth 253 of a gear rack member 254, slidable in ways 255 and also having gear rack teeth 256 at its upper end. Gear rack teeth 256 are enmeshed with the teeth 257 of a gear member 258 mounted on a shaft 259 and carrying a hold down bar support 260.

Preferably a pair of hold down bars 264 and 265 are provided, each depending from the hold down supports such as 260 and each having nylon bristles along the lower edge thereof to contact the strips S of dried alimentary paste. The hold down bars 264 and 265 are thus caused to oscillate downwardly along the full length of table O to rest on an intermediate portion of the row of strips S deposited on table O by the rod transfer arms 104 and 105 and to maintain the strips in the position of alignment achieved by the first and second aligning plates 225 and 235. Preferably, a spring 766 is provided as shown in Fig. 7 to counter balance the hold down bars.

Flattening bar

As shown in Fig. 23, a cam 266 is mounted on main drive shaft 610 and provided with a groove 267 in one of its diametrical faces 268. Groove 267 has a recessed portion 269 and has a cam follower pin 270 engaged therein. The operating mechanism is the same on both sides of cam 266, but reversed, and includes a pair of levers 271 and 272, each pivoted as at 273 and each having enmeshed teeth 275 and 276. Pin 270 is fixed to one lever such as 272 and when in the circular major portion of groove 267 causes lever 272 to assume the position shown in dotted lines. However, as shown in full lines, when pin 270 is engaged by the recessed portion 269, lever 272 is lowered to draw downwardly a link 277 pivoted at its terminal end 278. Link 277, at its upper end, is pivotally connected at 279 to an integral extension 280 of flattening bar 285. Flattening bar 285 is provided at each opposite end with a vertical slot such as 281 merging into an angular slot 282 and is supported by pins such as 283 in slots 281 and 282. When lever 272 is raised, flattening bar 285 thus moves upwardly and over to one side on the pins such as 283 and when lever 272 is lowered the bar 285 first moves sidewise and then down. The flattening bar 285 extends parallel to the aligning plates 225 and 235, parallel to the hold down bars 264 and 265 and parallel to the longitudinal axis of table O, proximate but above the looped ends of the strips S deposited on table O. When moved sidewise and then downward by cam 266 after the rod R has been withdrawn, bar 285 flattens the looped strips S on to the table in preparation for cutting of the loops thereof.

Loop cut off knife

Shaft 610 also carries a cam 286, provided with a substantially circular groove 287 in one diametrical face thereof (Fig. 24). Groove 287 is provided with a raised portion 288 and a pin 289 is engaged in the groove and fixed to one of a pair of levers 290 and 291 similar to those described above. The mechanism is similar on both sides of cam 286, but reversed, and each lever 290 and 291 includes teeth 292 and 293 which are enmeshed with each other. Lever 291 is pivoted at 294 to a bracket 295 and, at its terminal end, is pivotally connected at 296 to a bar 297 slidable vertically in guides 298. A guillotine type knife 299 is fixed at the upper ends of the bars such as 297 and is lowered when the pin 289 is engaged in the raised portion 288 of groove 287 of cam 286. Knife 299 extends longitudinally of table O, in position to cooperate with the front longitudinal edge 880 thereof (Fig. 11) in shearing off the looped ends of the strips S and is normally positioned above and between the strip flattening bar 285 and the second (or front) strip aligning plate 235.

Strip sweeping means

Figure 12:
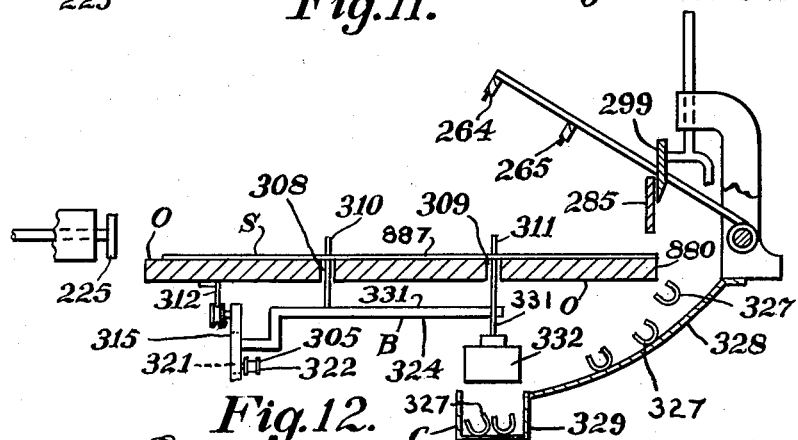

As shown in Figs. 12, 28 and 29 the strip sweeping means B of the machine is operated by a sprocket 300 carried by the main drive shaft 610. The sprocket 300 is connected by a chain 301 to a sprocket 302 carried by a shaft 303 extending longitudinally at one side of frame L. Another sprocket 304 is carried by shaft 303 and a chain 305 is trained therearound and around a similar sprocket 306 carried by a shaft 307 extending longitudinally of the opposite side of frame L. Chain 305 thus extends transversely of the machine parallel to the longitudinal axis of table O. Table O is provided with a pair of parallel slots 308 and 309 extending longitudinally thereof and arranged to accommodate sweeping fingers such as 310 and 311 positioned to contact intermediate portions of the strips S. Below table O, and parallel to chain 305 and slots 308 and 309, an upper track 312 and a lower track 313 are spaced apart parallel to each other. A carriage 315 having four grooved wheels 316, 317, 318 and 319 is mounted to reciprocate transversely of the machine in tracks 312 and 313.

Carriage 315 includes a vertical slot 320 for a slidable follower 321 to which one link 322 of chain 305 is attached. The link 322 moves the carriage across the machine, with follower 321 in the upper position, on the upper stretch of chain 305 and returns the carriage in the opposite direction with follower 321 in the lower position on the lower stretch of chain 305. Extending forwardly from follower 321 is a rod 324, having the pair of upstanding fingers 310 and 311 aligned with slots 308 and 309 of table O. Thus as chain 305, link 322 and carriage 315 move across the machine in the direction of cutting trough P, fingers 310 and 311 project upwardly through slots 308 and 309 to sweep the strips S across the table O and into trough P. This operation is timed to occur just after the loops have been cut from strips S by the loop knife 299.

Loop sweeping means

As also shown in Figs. 7 to 12 inclusive, the knife 299, in co-operation with the forward longitudinal edge 880 of table O, descends upon the aligned, held down and flattened looped ends of the strips S and simultaneously cuts off the entire row of loops 327 thereof. An inclined chute 328 is provided to guide the loops 327 into an horizontal chute 329 extending transversely of the machine and parallel with the longitudinal axis of table O directly under the slot 309 for sweeping finger 311. An extension 331 is provided on rod 324 which depends downwardly below finger 311 and terminates in a paddle 332 of the same cross sectional area as horizontal chute 329. After sweeping fingers 310 and 311 have swept along table O in slots 308 and 309 to sweep the straight strips S into trough P, the lowering of follower 321 at the end of the path of carriage 315 causes fingers 310 and 311 to drop below slots 308 and 309 and causes paddle 332 to enter horizontal chute 329. On the return trip therefore, paddle 332 sweeps the loops 327 along chute 329 and into a collecting bin 333 (see Fig. 3) at the side of the machine opposite to trough P. Paddle 332 is raised out of chute 329 when fingers 310 and 311 are raised by rod 324 to commence their passage across table O on the next cycle of the rod transfer arms 104 and 105. The loop sweeping means C with its paddle 332 and chutes 328 and 329 is thus powered by the strip sweeping means B and the loops 327 are sufficiently uniform in size to constitute a valuable commercial product especially for use in soups, etc.

Strip cutting means

The strip cutting means D of the invention is located at the trough P and includes mechanism for moving the pair of ends of the trough to centre the strips S, mechanism for gathering the strips into a compact bundle, mechanism for cutting through the bundled strips to form package lengths and mechanism for discharging the package lengths into the conveyor system Q.

Strip centering mechanism

As best shown in Figs. 15 and 16 the cam 226, carried by the main drive shaft 610 not only operates the second strip aligning plate but its groove 227 and raised portion 228 also perform a second function. A yoke type follower 350 is mounted to slide horizontally on a block 351 carried by shaft 610 and is provided with a pin 352, similar to pin 229, and also engaged in groove 227. When the raised portion 228 of groove 227 contacts pin 352 the yoke 350 moves a connecting rod 354 causing it to rotate a bell crank lever 355 pivoted on a spindle 356. The other arm 357 of lever 355 is attached to a slide 358, the slide being attached to one end 359 of trough P. The opposite end 360 of trough P is attached to a similar slide 361 and, by means of a link 363 and an arm 364 mounted to rotate with lever 355 around spindle 356, end 360 is drawn inwardly of trough P. Thus when yoke follower 350 is moved by cam 226 the pair of opposite ends 359 and 360 of trough P are caused to approach each other and to thereby centre the strips S in the trough. As indicated in Fig. 15, each movable end, such as 359, of trough P is of sheet material and slideable endwise within the trough P. Each end such as 359 is fixed in upstanding position to the end of a slide such as 358 and conforms in outline to the sector shaped cross section of trough P but with a somewhat rectangular upper portion extending above trough P and inwardly to overlie the table O. Slides 358 and 361 are fixed to end walls 359 and 360 above the level of the bottom 405 of trough P. The portions of end walls 359 and 360 overlying table O support the end walls and slides 358 and 361 when the trough bottom 405 is dropped to the position shown in Fig. 17. The slides 358 and 361 extend along the trough P just above the pivotline of bottom 405 and below the level of table O and therefore do not obstruct the knife 410.

Strip gathering mechanism

In Figs. 4, 5, 6, 20 and 29 the strip gathering mechanism of the invention is shown. A cam 375 is mounted on shaft 610 near gear box 43 and having a cam follower arm 376 pivoted at 377 to a stud 378 projecting from a portion of frame L. The cam follower pin 379 is engaged in an eccentric groove 380 in cam 375 and causes arm 376 through a connecting rod 381, to oscillate an arm 383 carried on a shaft 384 mounted on frame L. Shaft 384 extends forwardly to a point opposite trough P and carries an upstanding arm 385 pivotally connected at its upper portion, to a gear rack 386. Rack 386 is supported on a roller 387 and its teeth 388 are enmeshed with a gear 389 which in turn is enmeshed with a gear 390 carried on a shaft 391 extending along the outer and upper edge of trough P. As the eccentric groove 380 moves follower arm 376 to the left, the teeth 388 of gear rack 386 and the teeth of gears 389 and 390 cause four upstanding pins such as 392, 393, 394 and 395, one of which is best shown in Fig. 4, and all of which are fixed to shaft 391, to oscillate downwardly toward trough P. Four gathering arms 396, 397, 398 and 399 are freely rotatable on shaft 391 but the rear extensions such as 400 thereof are each connected to a pin such as 392 by springs such as 402. As shaft 391 is rotated, each pin such as 392, through a spring such as 402, oscillates an arm such as 396 downwardly until the gathering arms compactly bundle the strips S against the vertical wall 404 and the curved trough bottom 405 of trough P. Trough bottom 405 is a hinged trap door, the hinge pivot thereof being located along the side edge of table O. To avoid breaking the fragile strips S, the pins such as 392 continue rotating with shaft 391 but leave the gathering arms in the position shown in Figs. 5 and 6 by merely extending the springs such as 402. A slot such as 407 is provided in the sleeve portion of each gathering arm such as 396 to accommodate a pin such as 392 and to permit the pin to continue rotating with shaft 391 after the strips S have been compactly bundled.

Strip cutting mechanism

The strip cutting mechanism is shown in Figs. 1, 2, 5, 6, 20 and 29 and is operated by the shaft 391 of the strip gathering mechanism. As shown in Figs. 1 and 2, a pair of identical gathering arms such as 398 and 399 are each positioned proximate one of the opposite ends 359 and 360 of trough P. Another pair of gathering arms, 396 and 397 are positioned on each side of the centre of trough P and between them is positioned the strip cutting knife 410. Arms 396 and 397 differ from arms 398 and 399 in that arms 396 and 397 include integral segmental wall portions 408 and 409, in close juxtaposition to the side surfaces 411 and 412 of knife 410 and arranged to guide the knife 410 in its downward course. The knife 410 is mounted on a collar 413 fixed to shaft 391 and thus oscillates downwardly into trough P along with the pins such as 392 also fixed to shaft 391. After the shaft 391 and its pins have spring pulled the gathering arms 396, 397, 398 and 399 sufficiently to effect the compacting of strips S, the pins and the knife continue to oscillate downwardly while knife 410 cuts through the centre of the bundled strips. Preferably knife 410 is provided with a bulge at 417 whereby various portions of the cutting edge 418 will gradually contact the bundle of strips rather than an entire cutting edge simultaneously engaging the entire side of the bundle of strips. Knife 410 is provided with a pair of oppositely disposed studs such as 419 which rest on the extensions such as 400 of the gathering arms 396 and 397 and act as stop members on the upward movement of the knife 410 and gathering arms.

*Strip discharging means*

As shown in Fig. 17, main drive shaft 610 carries another cam 450 having a groove 451 in one diametrical face 452 thereof. A raised portion 453 is provided in groove 451 and a yoke type follower 454 is slidably mounted on a block 455 carried by shaft 610. A follower pin 456 extends from yoke follower 454 into groove 451 whereby the raised portion 453 of the groove will reciprocate the follower.

Follower 456 is connected by a rod 458 to the tip of the base member 459 of a T shaped lever 460 pivoted at 461 to frame L. One branch 462 of T shaped lever 460 is pivotally connected at 463 to a link 464 pivoted to the centre 465 of the curved trough bottom wall 405. As shown in dotted lines the reciprocation of rod 458 by cam 450 causes branch 462 and link 464 to bend at pivot 463 thereby lowering the bottom wall 405 and discharging the contents thereof into a box or bin 470.

The oppositely extending branch 471 of T shaped lever 460 (see Fig. 26) is provided with a slot 472 for a pin 473 carried at the end of a pawl lever 474. Pawl lever 474 is pivoted at 475 at the end of a link 476 mounted at its opposite end around a shaft 477 fixed to frame L. Shaft 477 carries a ratchet wheel 478 and an eccentric cam 479 and the pawl portion 481 of pawl lever 474 is engaged in the teeth 482 of ratchet wheel 478. Thus each time the T shaped lever 460 is oscillated to raise the trough bottom 405, it also causes the pawl lever 474 to rotate the ratchet wheel 478. Rotation of ratchet wheel 478 also causes cam 479 to rotate and, once in each revolution cam 479 moves cam follower 483. Cam follower 483 is fixed to an intermediate portion of a resilient arm 484, the lower portion of which arm is fixed to frame L at 485. The upper portion 486 of arm 487 carries a roller 488 normally in the path of a box 470 travelling along an endless conveyor 489. The downward pressure exerted by cam 479 on the end of cam follower 483 causes the cam follower to bow the resilient arm 487 as shown in dotted lines in Fig. 26, thereby retracting roller 488 from the path of the box 470 and permitting the box to continue along conveyor 489. The bowing of arm 487 also actuates a micro switch 490 electrically connected to a counting device in a well known manner thereby recording the number of boxes such as 470, filled by the machine. Further rotation of ratchet wheel 478 and cam 479 causes the arm 484 to again become straight and causes the roller 488 to intercept the next empty box on conveyor 489 until it is filled.

*Operation*

As explained above, the rod transfer means N of the invention is controlled by the speed changing means E whereby the heads 109 and 110 of rod transfer arms 104 and 105 pick up individually and successively the rods R from the rod feeding means M. Each rod R carries a row of looped dried alimentary paste strips such as S, the strips being of various lengths within a limited range and the rods being usually bowed in various amounts. If both pressure sensitive switches such as 92 and 93 are simultaneously contacted by the opposite ends of a rod R, each end of the rod R drops into the opening such as 122, down the ways such as 119 and 120, and is supported at the bottom 123 of a head such as 109 and 110.

The arms 104 and 105 then move downwardly clockwise through an arcuate path at accelerated speed carrying a rod R while the lower portions of the strips S contact bars such as 158 or 159 which exert a retarding effect to assist in changing the strips S from a vertical depending position to a horizontal table supported position. Arms 104 and 105 are slowed down by speed changing means E about two inches above the sweeping table O and lay the strips S down carefully thereon as shown in Fig. 7. Speed changing means E then rapidly withdraws the heads 109 and 110 transversely across table O to withdraw the rod R from the unlooped ends 889 of the strips S.

It should be noted that since the rods R are usually bowed, the strips S at the centre will hang lower than those near the ends. Thus when rod R is laid on table O the looped ends 327 of the strips S will not be in a straight line but will be more advanced near the ends of the row of strips than at the centre. If the loops were cut off at this time by a longitudinally extending straight knife, the centre loops 327 cut off would be short and the end loops 327 cut off would be long and include too much of the strip S.

Therefore, as indicated in Fig. 7, as soon as the bowed row of strips S is deposited on table O, the first strip aligning plate 225, which is bowed longitudinally with its centre in advance of its ends, moves forward to oppose the withdrawing effect of the heads 109 and 110 and to align the unlooped ends 889 as well as the looped ends 327 of the strips S. The plate 225 causes the unlooped ends 889 of strips S to be aligned in bowed formation and the looped ends 327 to assume a substantially straight line.

Figure 8:
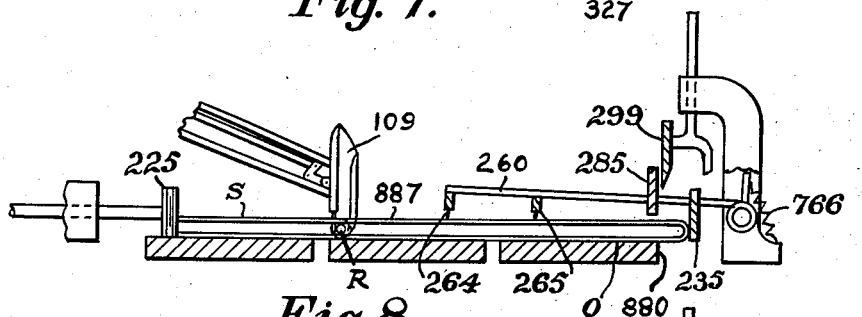

As shown in Fig. 8, when the rod R is about half withdrawn from the strips, and the plate 225 has pushed the looped ends 327 of the strips S up against the second strip aligning plate 235, the hold down bars 264 and 265 oscillate downwardly so that their soft bristles tend to hold the straight portions 887 of the strips S from movement in either direction transversely of Table O. Bars 264 and 265 stay down during the remainder of the loop cut off operation as shown in the succeeding views.

Figure 9:
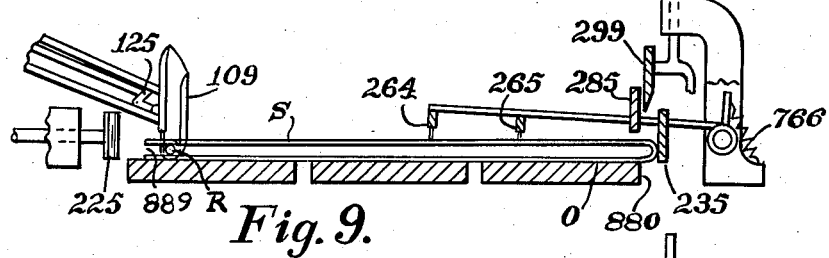

In Fig. 9 the first strip aligning plate 225, having performed its function, is shown withdrawn out of the way of the heads 109 and 110 and of the rod R which is about to emerge from the unlooped ends 889 of strips S. At the same time, the second strip aligning plate 235 has moved up toward the forward longitudinal edge 880 of table O pushing the straight line of looped ends 327 ahead of it and positioning them at the desired distance for cutting. This operation takes place against the resistance of the bristles of hold down bars 264 and 265 and results in the unlooped ends 889 of the strips S being not in alignment. However, by cutting looped portions 327 of uniform length from strips S, a better commercial product is obtained and the slight variation in length of the remaining straight portions 887 of the strips S does not affect the packaging thereof. Furthermore, by leaving no excess material on the loops 327, and leaving such excess material on the remaining straight portions 887 of strips S, the portions 887 weigh more in the package and no waste results.

Figure 10:
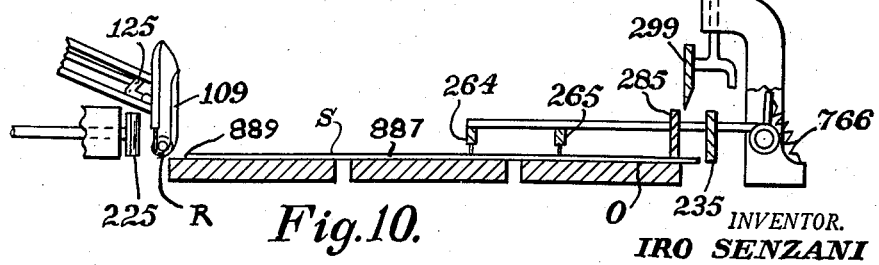

As shown in Fig. 10, the rod R has been completely withdrawn from the strips S and will continue to travel on the path of rod transfer arms 104 and 105 until the gates such as 124 are retracted in heads 109 and 110 and the rod drops into the collecting elements 132. As soon as strips S are free of the rod R, the flattening bar 285 moves sidewise and then down so that its soft undersurface will tend to flatten the strips S on table O. The second strip aligning plate 235 then commences its retracting movement since its function is complete.

Figure 11:
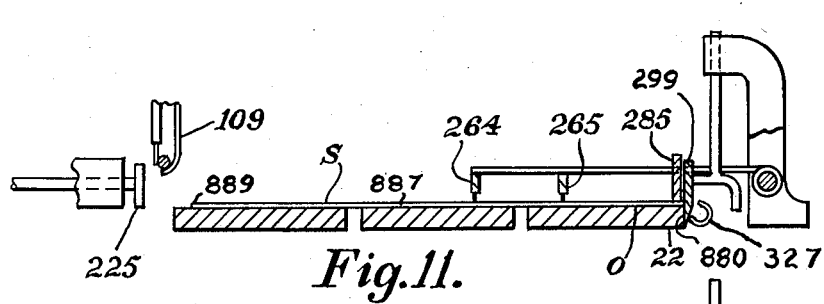

In Fig. 11 the heads 109 and 110 are shown rising on an inclined plane under the influence of the oppositely disposed cams 143 and 144, the hold down arms 264 and 265 and the flattening bar 285 are holding the flattened strips S down on table O and the knife 299 is shearing off the loops 327 in cooperation with edge 880 of table O.

In Fig. 12, the hold down bars 264 and 265 are rising as is the flattening bar 285 while the sweeping fingers 310 and 311 are being advanced along slots 308 and 309 of table O by carriage 315 to sweep the straight portions 887 of strips S into trough P. The cut loops 327 are sliding down inclinded chute 328 into horizontal chute 329 whence they will be swept to the other side of the machine by paddle 332 on the return trip of carriage 315.

As indicated in Fig. 16, the straight strips 887 of strips S are then centered in trough P by the inwardly movable ends 359 and 360 of trough P. When centered, the straight strips 887 are then gathered by gathering arms such as 396, 397, 398 and 399 in a compact bundle against vertical wall 404 and the curved bottom wall 405 of trough P as shown in Fig. 5.

In Fig. 6 the strip cutting knife 410 is shown cutting through the center of the bundle of strips S in trough P and in Fig. 17 the trough bottom wall 405 is shown discharging its package length contents into a box 470 on a box conveyor 489.

I claim:

1. In the method of automatically and successively converting rows of dried alimentary paste strips, each row of strips depending by looped portions from a drying rod, into a plurality of shorter package products, said method including the steps of engaging a rod from which a row or alimentary paste strips are depending, depositing rod and strips on a substantially horizontal surface and withdrawing the rod from said strips, the additional steps, immediately after the step of depositing a rod on said surface, of aligning the unlooped ends of said strips, then holding said strips down on said surface during the withdrawal of the rod therefrom, then aligning the looped ends of said strips while on said surface, then flattening said strips while on said surface, then cutting off the looped ends of said strips while on said surface, then sweeping the strips into a bundle at the side of said surface, gathering said bundle and cutting through an intermediate portion thereof while so gathered.

2. A method as specified in claim 1 plus the steps of aligning the opposite ends of the strips of said bundle after the sweeping step and prior to gathering and cutting said bundle.

3. A method as specified in claim 1 plus the steps of sweeping the cut-off looped ends of said strips to one side of said surface and collecting the same.

4. A method as specified in claim 1 wherein the strips are held down on said surface continuously from just after the deposit of the strips on the surface until just prior to the sweeping step.

5. A method as specified in claim 1 wherein the step of aligning the unlooped ends of said strips includes the displacement of the unlooped end portions of the medial portion of the row of strips further than the unlooped end portions of the strips at the ends of said row.

6. A method as specified in claim 1 wherein the rod is engaged and deposited at a relatively low speed but transferred and withdrawn at a relatively high speed.

7. In a machine for automatically and successively converting rows of dried alimentary paste strips, each row of strips depending by looped portions from a drying rod, into a plurality of shorter package products, said machine having a sweeping table with a cutting trough at one end thereof, and having a pair of rod transfer arms moving in a closed path and adapted to transfer and deposit each drying rod successively with the strips supported thereon upon the surface of said sweeping table and to withdraw the rod from said strips in combination with means for cutting off the looped ends of said strips in identical lengths to leave straight sections spread flatwise on said surface; means for sweeping said straight sections across said surface into said cutting trough and means for aligning the ends of said straight sections in said cutting trough.

8. A combination as specified in claim 7 plus mechanism for aligning the unlooped ends of said strips in bowed formation; mechanism for aligning the looped ends of said strips in straight line formation; mechanism for flattening said strips against said surface, and mechanism for holding said strips down on said surface, said last named mechanism being operable during the operation of all of the prior named mechanisms.

9. A combination as specified in claim 7 plus means for sweeping said cut off looped portions of said strips over to one side of said machine for collection.

10. A combination as specified in claim 7 plus means for moving said rod transfer arms more slowly along their closed path while depositing the rod with the strips supported thereon upon the sweeping table than while subsequently withdrawing the rod from said strips.

11. In a machine for cutting a row of looped dried alimentary paste strips of non uniform length into package lengths, said machine having a sweeping table with a cutting trough at one end thereof, the combination of means for aligning and shearing off identical sized looped ends of said strips to leave straight sections of non-uniform length spread flatwise on said table; means for sweeping said straight sections across said table and into said trough, means for aligning the opposite ends of said straight sections in said trough, means for gathering said sections into a compact bundle in said trough; means for cutting through an intermediate portion of said bundle to form package lengths and means for discharging said lengths from said trough.

12. In a machine for cutting a row of looped dried alimentary paste strips into straight sections of substantially identical length, said machine having a table for supporting said row of strips with each strip extending laterally thereof, the combination of a first strip aligning plate extending longitudinally of said table and mounted to move toward and away from the unlooped ends of said strips to align the same; a second strip aligning plate extending longitudinally of said table and mounted to move toward and away from the looped ends of said strips to align the same after alignment by said first strip aligning plate; a strip flattening bar extending longitudinally of said table and mounted to move downward and sidewise, proximate the looped ends of said strips, to flatten the strips on said table after alignment by said second strip aligning plate; a loop cut off knife extending longitudinally of said table and mounted to move downward to cut off the looped portions of said strips after flattening by said strip flattening bar and a strip holddown bar, extending longitudinally of said table and mounted to move downwardly into engagement with an intermediate portion of said row of strips to hold the same down on said table during the operation of said strip flattening bar and said loop cut off knife.

13. A machine as specified in claim 12 plus at least one strip sweeping finger, projecting upwardly through a longitudinal slot in said table and mounted to travel therealong to sweep said strips into a bundle at one side of said machine after the cutting off of said looped portions by said loop cut off knife.

14. A machine as specified in claim 12 plus a longitudinally extending inclined chute and horizontal chute positioned to collect said cut off looped portions and a paddle mounted to sweep said looped portions along said horizontal chute and into a receptacle at one side of said machine.

15. In a machine for cutting a row of looped dried alimentary paste strips into shorter package products, said machine having a table for supporting said row of strips, with each strip extending laterally thereof, and a cutting trough at one end of said table, the combination of a first longitudinally extending strip aligning plate mounted to move laterally across said table for aligning the unlooped ends of the strips; a second longitudinally extending strip aligning plate mounted to move laterally across said table for aligning the looped ends of the strips; a longitudinally extending strip flattening bar mounted to move downwardly and sidewise onto said table for flattening the strips against said table; a longitudinally extending loop cut off knife mounted to move downwardly toward said table for cutting off said looped portions; at least one longitudinally extending strip hold-down bar mounted to move downwardly for engaging the intermediate portions of the strips and for holding the same down on the table during said flattening and cutting; at least one strip sweeping finger, projecting upwardly through a longitudinal slot in said table and mounted to sweep the cut straight portions of said strips into said cutting trough; a pair of ends on said trough mounted to move laterally toward each other for aligning the opposite ends of said straight strip portions in said trough; at least one gathering arm mounted to oscillate downwardly toward a laterally extending wall of said trough for gathering said straight strip portions into a compact bundle against said wall; a strip cutting knife, mounted to oscillate downwardly toward said laterally extending wall of said trough for cutting through an intermediate portion of said straight strips while so gathered and a laterally extending bottom wall portion of said trough, mounted to pivot downwardly for discharging the cut sections of said strips from said trough.

16. A machine as specified in claim 15 plus a longitudinally extending inclined chute and horizontal chute for collecting said cut off looped portions and a paddle mounted to sweep along said horizontal chute for sweeping said looped portions to one side of said machine.

17. A machine as specified in claim 15 wherein said first strip aligning plate is bowed to compensate for disalignment of the ends of the strips on said table.

18. Apparatus for converting a row of U shaped, dried, alimentary paste strips, each strip having the looped portion thereof facing in a common direction and some of said strips being of non-uniform length, into severed loops and straight, unlooped sections of maximum length, said apparatus comprising a table having a flat surface supporting said row of strips with said looped portions extending laterally thereof; a pair of spaced longitudinally extending aligning means, each movable laterally of said flat surface for aligning first the ends of the unlooped sections of the strips and then the looped portions of said strips in a straight line, longitudinally extending strip holddown means moveable downwardly toward said flat surface for pressing said row of strips thereagainst; longitudinally extending knife means moveable downwardly toward said flat surface for shearing off loops of identical length from said row of strips leaving straight sections thereof of non-uniform length on said flat surface and mechanism for moving said means in synchronization with each other.

19. A combination as specified in claim 18 plus means for gathering said straight sections into a compact bundle and medially severing said bundle while so compacted.

References Cited in the file of this patent

UNITED STATES PATENTS

| | | |
|---|---|---|
| 2,220,438 | Ambrette | Nov. 5, 1940 |
| 2,248,688 | Petrovic | July 8, 1941 |
| 2,649,055 | Borrelli | Aug. 18, 1953 |
| 2,649,056 | Autenrieth | Aug. 18, 1953 |